US008230407B2

(12) United States Patent
Song et al.

(10) Patent No.: US 8,230,407 B2
(45) Date of Patent: Jul. 24, 2012

(54) APPARATUS AND METHOD FOR ACCELERATING JAVA TRANSLATION

(75) Inventors: Hyo-jung Song, Seoul (KR); Ciji Isen, Cochin (IN); Lizy K. John, Austin, TX (US)

(73) Assignees: Samsung Electronics Co., Ltd., Suwon-Si (KR); Board of Regents, The University of Texas System, Austin, TX (US)

(*) Notice: Subject to any disclaimer, the term of this patent is extended or adjusted under 35 U.S.C. 154(b) by 1242 days.

(21) Appl. No.: 11/965,800

(22) Filed: Dec. 28, 2007

(65) Prior Publication Data

US 2008/0301652 A1     Dec. 4, 2008

(30) Foreign Application Priority Data

Jun. 4, 2007 (KR) .................. 10-2007-0054663

(51) Int. Cl.
G06F 9/45 (2006.01)

(52) U.S. Cl. ........................... 717/148; 717/139
(58) Field of Classification Search .............. 717/118, 717/139, 137
See application file for complete search history.

(56) References Cited

U.S. PATENT DOCUMENTS

| | | | | |
|---|---|---|---|---|
| 6,314,445 | B1* | 11/2001 | Poole | 718/1 |
| 6,481,006 | B1* | 11/2002 | Blandy et al. | 717/139 |
| 6,965,984 | B2* | 11/2005 | Seal et al. | 712/209 |
| 2004/0015896 | A1* | 1/2004 | Dornan et al. | 717/139 |
| 2004/0210865 | A1* | 10/2004 | Shimura | 717/100 |
| 2004/0236927 | A1* | 11/2004 | Irie et al. | 712/209 |
| 2006/0200801 | A1* | 9/2006 | Patel et al. | 717/118 |
| 2007/0088831 | A1* | 4/2007 | Pallamreddy et al. | 709/227 |

* cited by examiner

*Primary Examiner* — Hung T Vy
*Assistant Examiner* — Mongbao Nguyen
(74) *Attorney, Agent, or Firm* — Sughrue Mion, PLLC

(57) ABSTRACT

An apparatus and method for accelerating Java translation are provided. The apparatus includes a lookup table which stores an lookup table having arrangements of bytecodes and native codes corresponding to the bytecodes, a decoder which generates pointer to the native code corresponding to the feed bytecode in the lookup table, a parameterized bytecode processing unit which detects parameterized bytecode among the feed bytecode, and generating pointer to native code required for constant embedding in the lookup table, a constant embedding unit which embeds constants into the native code with the pointer generated by the parameterized bytecode processing unit, and a native code buffer which stores the native code generated by the decoder or the constant embedding unit.

10 Claims, 5 Drawing Sheets

APPARATUS AND METHOD FOR ACCELERATING JAVA TRANSLATION

CROSS-REFERENCE TO RELATED APPLICATION

This application claims priority from Korean Patent Application No. 10-2007-0054663 filed on Jun. 4, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to accelerating Java translation, by which optimized bytecode can be generated.

2. Description of the Related Art

Java is an object-orientated programming language developed by Sun Microsystems, Inc., which has several significant advantages over related art programming languages, including platform independence, sandbox model security and code compaction. Java code is small, simple and portable across platforms and operating systems.

In related art programming languages, the source code of a program is sent to a compiler which translates the program into machine code or processor instructions, which include native instructions. For example, an instruction compiled for the x86 system can only be executed by the x86 system only.

However, the Java compiler takes a Java program and generates bytecodes. Bytecodes are instructions that look like machine code, but are not specific to any processor. To execute Java bytecode, a Java Virtual Machine is necessary.

The Java Virtual Machine interprets Java bytecode and converts it to equivalent native code. Since bytecode is not specific to any processor, programs in bytecode can run on any architecture as long the Java Virtual Machine is available.

One disadvantage of Java bytecode is a slow execution speed. System-specific programs that run directly on the hardware for which they are compiled run significantly faster than Java bytecode, which must be processed by the Java Virtual Machine. The processor must both convert the Java bytecodes into native instructions in the Java Virtual Machine and execute the native instructions.

There are several techniques for improving the execution speed of Java bytecode; one is to speed up the Java Virtual Machine by a technique called "Just-in-Time" (JIT) compiling, which, however has disadvantages of a slow execution speed and a JIT compile overhead.

To overcome these disadvantages, the use of a Java hardware accelerator has been proposed. The Java hardware accelerator converts Java bytecodes into native codes using a lookup table. That is, the Java hardware accelerator attempts to speed up the execution speed by converting the Java bytecode into the native code stored in the lookup table.

Even with the Java hardware accelerator, there still exist problems of additional memory usage and power consumption. Accordingly, it is desirable to provide a technique capable of achieving the minimum memory usage and low power consumption. What is needed, therefore, is a method for optimizing the process of converting bytecode into native code.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for accelerating Java translation, by which generate native codes optimized to bytecodes can be generated.

According to an aspect of the present invention, there is provided an apparatus for accelerating Java translation, the apparatus including an lookup table having arrangements of bytecodes and native codes corresponding to the bytecodes, a decoder generating pointer to the native code corresponding to the feed bytecode in the lookup table, a parameterized bytecode processing unit detecting parameterized bytecode among the feed bytecode, and generating pointer to native code required for constant embedding in the lookup table, a constant embedding unit embedding constants into the native code with the pointer generated by the parameterized bytecode processing unit, and a native code buffer storing the native code generated by the decoder or the constant embedding unit.

According to another aspect of the present invention, there is provided a method for accelerating Java translation, the method including determining whether feed bytecode is parameterized bytecode, invoking native code required for constant embedding, the native code corresponding to the parameterized bytecode, detecting key instructions from the invoked native code, and embedding constants into the identified key instructions.

BRIEF DESCRIPTION OF THE DRAWINGS

The above and other aspects of the present invention will become apparent by describing in detail exemplary embodiments thereof with reference to the attached drawings in which.

DETAILED DESCRIPTION OF EXEMPLARY EMBODIMENTS OF THE INVENTION

Figure 1:
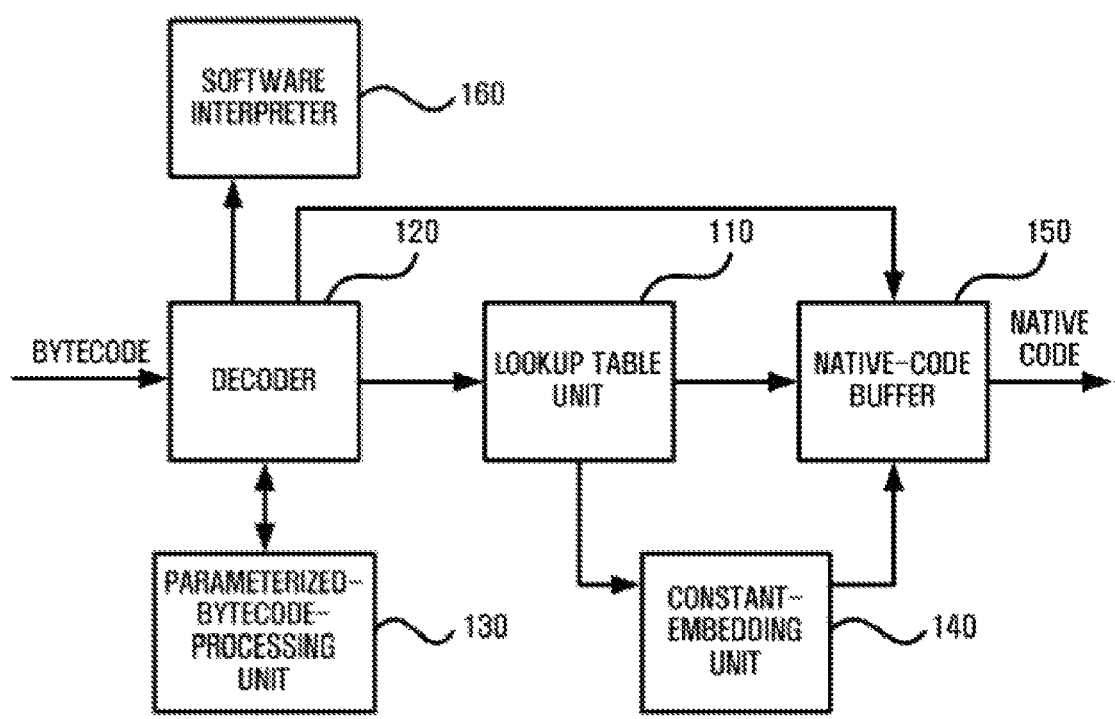
FIG. 1 is a diagram illustrating an apparatus for accelerating Java translation according to an exemplary embodiment of the parent invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

An apparatus and method for accelerating Java translation according to the present invention will be described hereinafter with reference to flowchart illustrations of methods according to exemplary embodiments of the invention.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to create means for implementing the functions specified in the flowchart block or blocks.

These computer program instructions may also be stored in a computer usable or computer-readable memory that can direct a computer or other programmable data processing apparatus to function in a particular manner, such that the instructions implement the function specified in the flowchart block or blocks.

The computer program instructions may also be loaded into a computer or other programmable data processing apparatus to cause a series of operational steps to be performed on the computer or other programmable apparatus to produce a computer implemented process for implementing the functions specified in the flowchart block or blocks.

In addition, each block may represent a module, a segment, or a portion of code, which may comprise one or more executable instructions for implementing the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in reverse order, depending on the functionality involved.

For a better understanding of the present invention, the following includes definitions of selected terms employed in the specification.

Bytecode is a compiled form of a Java program. Once a Java program is converted into a bytecode, the Java program can be transmitted via a network or executed by a Java virtual machine.

Native code is a machine language that is executed on a specific platform. The native code is converted from bytecode by a virtual machine.

Parameterized bytecode is bytecode having a parameter value. That is, a bytecode executed depending on a specific value.

A key instruction is a native instruction into which a constant corresponding to the parameter value is to be embedded in a set of native code corresponding to parameterized bytecode.

FIG. 1 is a diagram illustrating an apparatus for accelerating Java translation according to an exemplary embodiment of the present invention.

A lookup table unit 110 stores a lookup table including arrangements of bytecodes and native codes corresponding to the bytecodes. The native codes may differ depending on a central processing unit (CPU) used and the native codes corresponding to the bytecodes constitute a set of one or more native instructions.

The lookup table stored in the lookup table unit 110 is used for a decoder 120 or a parameterized bytecode processing unit 130 to analyze native code corresponding to feed bytecode.

Since the lookup table 110 does not store all bytecodes, the decoder 120 preferably, but not necessarily, determines whether feed bytecode exists in the lookup table 110.

The lookup table unit 110 stores information about key instructions, that is, native instructions into which constants are embedded. The information about the stored key instructions is used for a constant embedding unit 140 to identify the key instructions from the native instructions.

Preferably, but not necessarily, the lookup table unit 110 stores mask pattern of key instructions. The stored mask pattern of key instructions is used to identify constant embedding locations in the constant embedding unit 140 embedding constants into the native code.

The decoder 120 generates a pointer to the native code corresponding to the feed bytecode in the lookup table unit 110. The pointer generated in the lookup table unit 110 is useful for extracting the native instruction set from the lookup table unit 110.

The decoder 120 determines whether the feed bytecode exists in the native code buffer 150. If the feed bytecode exists in the native code buffer 150, the corresponding native code is returned to the CPU, thereby increasing the processing speed.

In addition, the decoder 120 determines whether the feed bytecode exists in the lookup table unit 110. The lookup table stored in the lookup table unit 110 does not include all native codes corresponding to the feed bytecode. Thus, if the feed bytecode does not exist in the lookup table, a software interpreter 160 interprets the bytecode.

The parameterized bytecode processing unit 130 may be incorporated into the decoder 120.

The parameterized bytecode processing unit 130 detects parameterized bytecode. If feed bytecode is parameterized bytecode, the parameterized bytecode processing unit 130 generates a pointer to native code into which constants are embedded in the lookup table 110. That is, the parameterized bytecode processing unit 130 invokes native instructions corresponding to constant versions of the bytecode. Here, the parameterized bytecode is not converted into native code having parameter values but into native code having fixed values.

Preferably, but not necessarily, the parameterized bytecode processing unit 130 stores a list of parameterized bytecode.

An example of processing a Java bytecode implemented in an ARM CPU is described in the following. The Java bytecode "ILOAD 10" means that ILOAD needs to load a value stored in a local variable 10 of the stack. Conventionally, in a case where ILOAD 10, for example, is feed, a native code corresponding to ILOAD is generated and a local variable address is computed.

The conventional native code corresponding to ILOAD is as follows.

LDRB reg1,[reg2],#offset
LDR reg1,[reg2+reg3 shift #n]
STR reg1,[reg2+offset]

In contrast, since the inventive Java bytecode "ILOAD 10" is a parameterized bytecode, the parameterized bytecode processing unit 130 generates a pointer necessary in embedding constants into the native code. That is, for ILOAD 10, a native instruction corresponding to ILOAD_0 is invoked.

Native code corresponding to ILOAD_0, according to the present invention, is as follows.

LDR r0,[VM_lp,#0]
STR r0,[VM_sp,#4]!

Compared to the conventional case, according to the present invention, the number of native instructions converted from bytecode can be reduced, that is, from three (3) to two (2), suggesting that memory usage is reduced and the execution speed is accelerated.

The parameterized bytecode processing unit 130 analyzes a parameter value of the parameterized bytecode. The parameter value of the parameterized bytecode should be suitable for an immediate field in a native instruction. In this example, since each address has an incremental of 4, the number of available bits in the immediate field may be read as: 9−2=7. In this way, only when the parameter value is smaller than 128 is it encoded as an immediate operand. That is, for ILOAD 10, since the parameter value, i.e., 10, is smaller than 128, a native instruction corresponding to ILOAD_0 is invoked.

If the parameter value is not suitable for an immediate field in a native instruction, the parameterized bytecode processing unit 130 generates a pointer required for embedding constants into the native code according to the conventional manner.

The constant embedding unit 140 embeds constants into the native code with the pointer generated by the parameterized bytecode processing unit 130. Here, the embedded constants are values corresponding to parameter values input at the ends of the native code with the pointer. That is, the parameter value of the bytecode is encoded into immediate field of the native code.

The constant embedding unit 140 preferably, but not necessarily, performs a function of identifying key instructions using constants from non-key instructions among the native instructions. Native code constitutes a set of one or more native instructions with a pointer generated thereat, and the constant embedding unit 140 identifies constant embedded key instructions from the one or more native instructions. Information about key instructions is preferably, but not necessarily, stored in the lookup table 110.

In the above-described example, native instruction codes corresponding to ILOAD_0 are as follows.

LDR r0,[VM_lp,#0]
STR r0,[VM_sp,#4]!

In this example, the key instruction is LDR r0, [VM_lp,#0]. Accordingly, when a constant corresponding to the parameter value, i.e., 10, is embedded into the key instruction, the key instruction with the constant, i.e., 10, embedded therein reads as:

LDR r0,[VM_lp,#40]
STR r0,[VM_sp,#4]!

As confirmed from the following, the same native code as the native code conventionally converted from ILOAD 10 is obtained according to the present invention.

LDRB r0,[VM_ip],#1
LDR r0,[VM_lp,r0,LSL #2]
STR r0,[VM_sp,#4]!

The comparison results of conversion processes according to the conventional manner and the present invention show that while using the same procedure, the present invention advantageously reduces the number of native instructions, e.g., two (2) from three (3) in the case of the conventional manner. Therefore, the present invention reduces the amount of memory used, and increases the translation speed.

In addition, it is possible to prevent native code corresponding to ILOAD_1, ILOAD_2, and ILOAD_3 from being stored in the lookup table unit 110. These ILOADs can be generated at ILOAD_0. In such a manner, a storage space for ILOAD_1, ILOAD_2, and ILOAD_3 can be saved, so that additional storage space for other bytecodes can be secured.

Preferably, but not necessarily, the constant embedding unit 140 reads the mask pattern of the key instructions stored in the lookup table unit 110 for constant embedding. In most cases, immediate fields are fixed locations of the key instructions. In few cases, however, in which an immediate field is not at a fixed location of a key instruction, a complicated procedure may be involved. Accordingly, the mask pattern of key instructions are stored in the lookup table unit 110, and the constant embedding unit 140 reads the mask pattern from the lookup table unit 110 for reference in constant embedding.

The native code buffer 150 stores the native code generated by the decoder 120 or the constant embedding unit 140. The native code buffer 150 stores the native code and supplies the same to the CPU.

The native code buffer 150 preferably, but not necessarily, stores bytecode feed together with the native code. In the case where the feed bytecode exists in the native code buffer 150, the corresponding native code is returned to the CPU as per request by the decoder 120.

Here, various components of the Java translation accelerating apparatus according to the present invention may be implemented as, but are not limited to, software, hardware or firmware. Each component may advantageously be configured to reside on an addressable storage medium and configured to be executed on one or more processors. The functionality provided for in the components may be combined into fewer components or further separated into additional components.

In an alternative exemplary embodiment, the apparatus for accelerating Java translation may be incorporated into the CPU.

Figure 2:
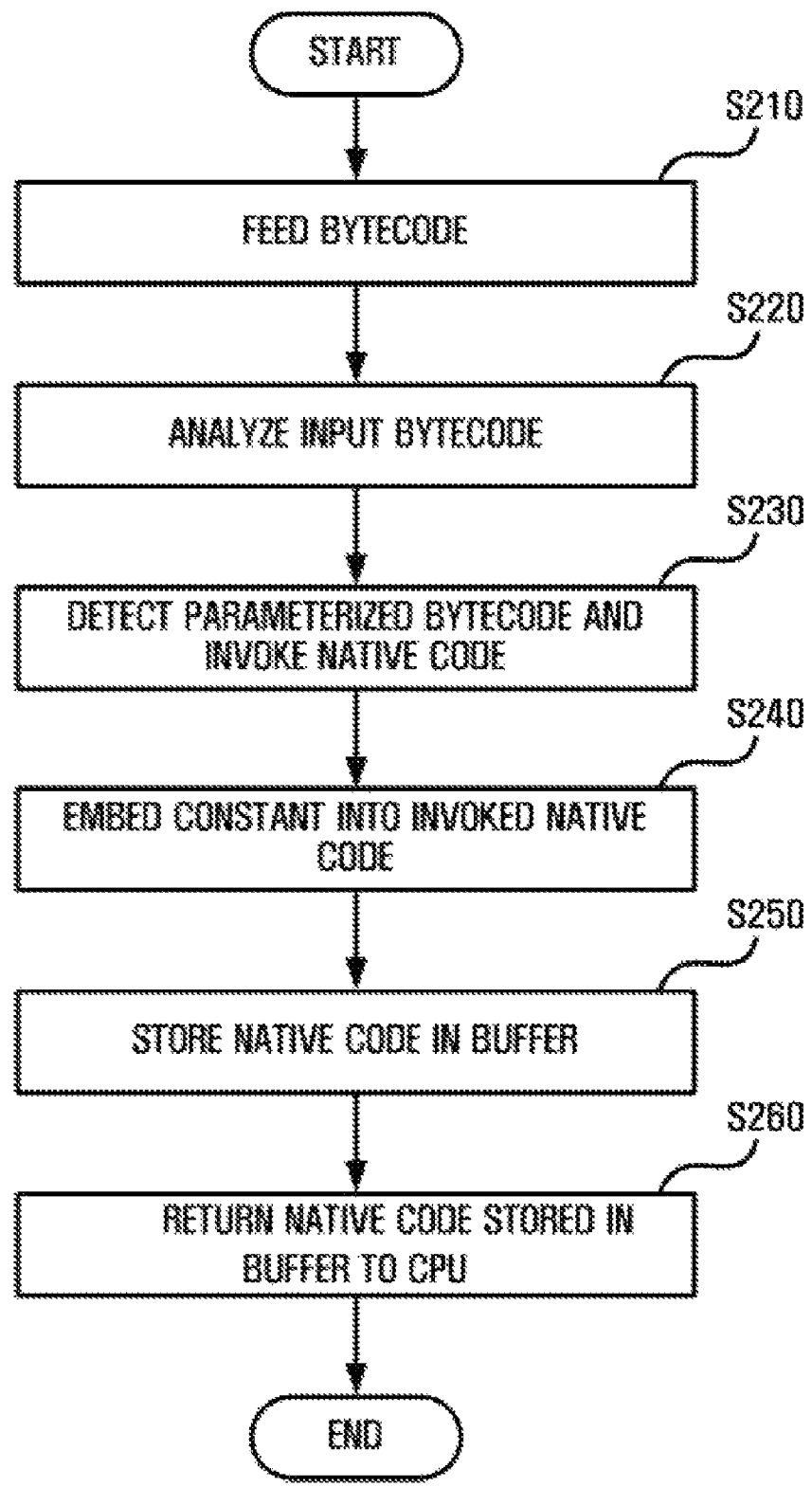
FIG. 2 is a flow diagram illustrating a method of accelerating Java translation according to an exemplary embodiment of the parent invention.

FIG. 2 is a flow diagram illustrating a method of accelerating Java translation according to an exemplary embodiment of the parent invention.

Bytecode to be converted is feed from the CPU into the decoder 120 in operation S210.

Then, the decoder 120 analyzes the feed bytecode in operation S220.

After analyzing the feed bytecode, the parameterized bytecode processing unit 130 detects parameterized bytecode from non-parameterized bytecode, and invokes native code in operation S230.

Thereafter, the constant embedding unit 140 embeds constants into the native code in operation S240.

In operation S250, the native code buffer 150 stores the native code generated by the decoder 120 or the constant embedding unit 140. The native code buffer 150 preferably, but not necessarily, stores the bytecode feed together with the native code.

The native code buffer 150 sends the native code stored therein back to the CPU in operation S260.

The method for accelerating Java translation according to the parent invention will now be described in greater detail with reference to FIGS. 3 through 5.

Figure 3:
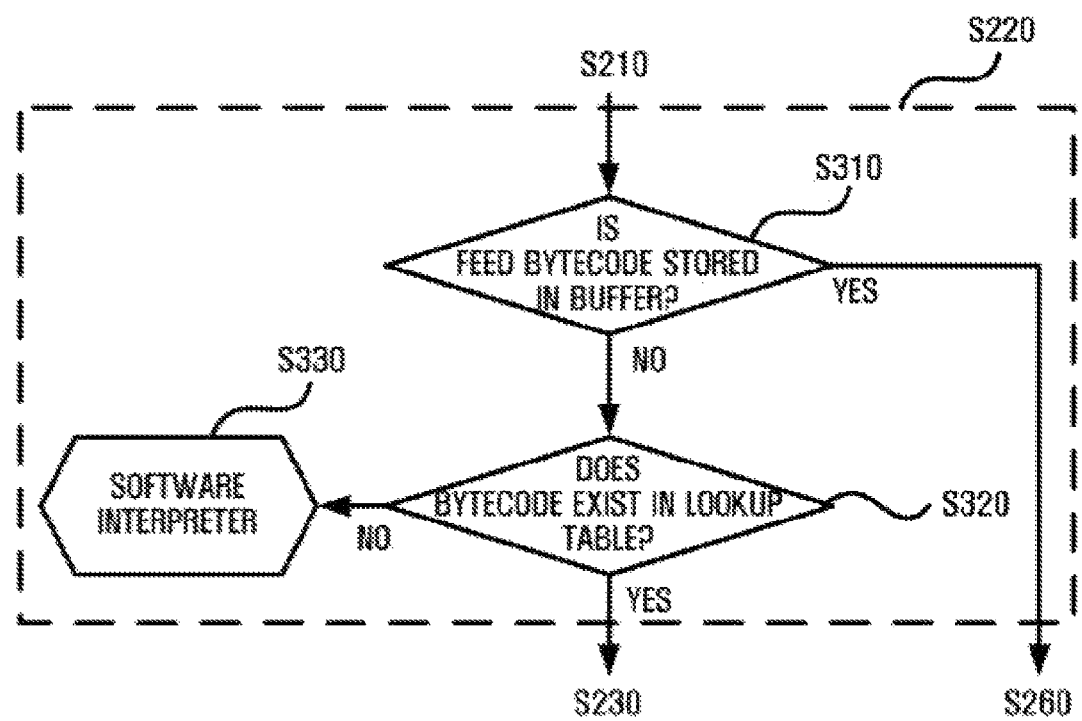
FIG. 3 is a flow diagram illustrating a process of analyzing feed bytecode in the method for accelerating Java translation according to an exemplary embodiment of the parent invention.

FIG. 3 is a flow diagram illustrating a process of analyzing feed bytecode in the method for accelerating Java translation according to an exemplary embodiment of the present invention.

In operation S310, the decoder 120 determines whether the feed bytecode exists in the native code buffer 150. If the feed bytecode exists in the native code buffer 150, the procedure goes to operation S260 to return the corresponding native code to the CPU, thereby improving the processing speed.

In operation S320, the decoder 120 determines whether the feed bytecode exists in the lookup table unit 110. If the feed bytecode exists in the lookup table unit 110, the procedure goes to operation S230. The lookup table unit 110 does not include native codes for all the bytecodes. Accordingly, if the feed bytecode does not exist in the lookup table unit 110, the software interpreter 160 interprets the bytecode in operation S330.

Figure 4:
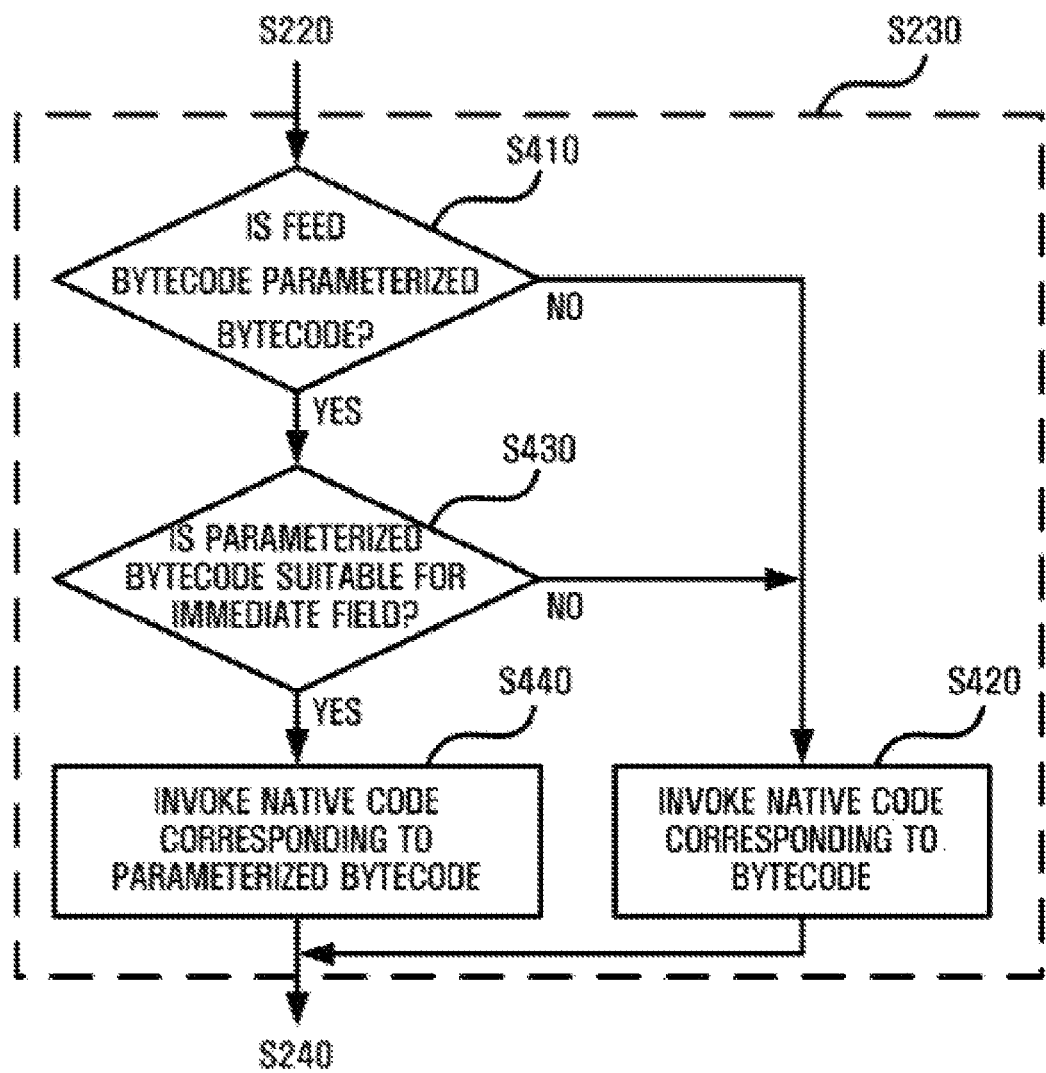
FIG. 4 is a flow diagram illustrating a process of invoking native code by identifying key instructions from parameterized bytecode in the method for accelerating Java translation according to an exemplary embodiment of the parent invention.

FIG. 4 is a flow diagram illustrating a process of invoking native code by detecting parameterized bytecode in the method for accelerating Java translation according to an exemplary embodiment of the parent invention.

The parameterized bytecode processing unit 130 determines whether the feed bytecode is to be parameterized bytecode in operation S410. The parameterized bytecode processing unit 130 detects parameterized bytecode by referring to a list of the parameterized bytecode stored in the lookup table unit 110.

If the feed bytecode is not parameterized bytecode, a pointer to native code converted from the feed bytecode stored in the lookup table unit 110 is generated by the decoder 120. In operation S420, the native code corresponding to the feed bytecode is invoked.

The parameterized bytecode processing unit 130 analyzes parameter values of the parameterized bytecode and determines whether the parameterized bytecode is suitable for immediate fields in the native instructions in operation S430.

If the parameterized bytecode is not suitable for immediate fields in the native instructions, a pointer to native code corresponding to the feed bytecode is generated by the parameterized bytecode processing unit 130 and the procedure goes to operation S420 to invoke the native code corresponding to the feed bytecode.

The parameterized bytecode processing unit 130 generates a pointer to the native code that can be used for embedding constant from lookup table unit 110, and invokes the native code corresponding to the parameterized bytecode in operation S440. That is, the parameterized bytecode processing unit 130 invokes the native code corresponding to constant versions of the bytecode. The parameterized bytecode is not converted into native code having parameter values but into native code having fixed values.

Figure 5:
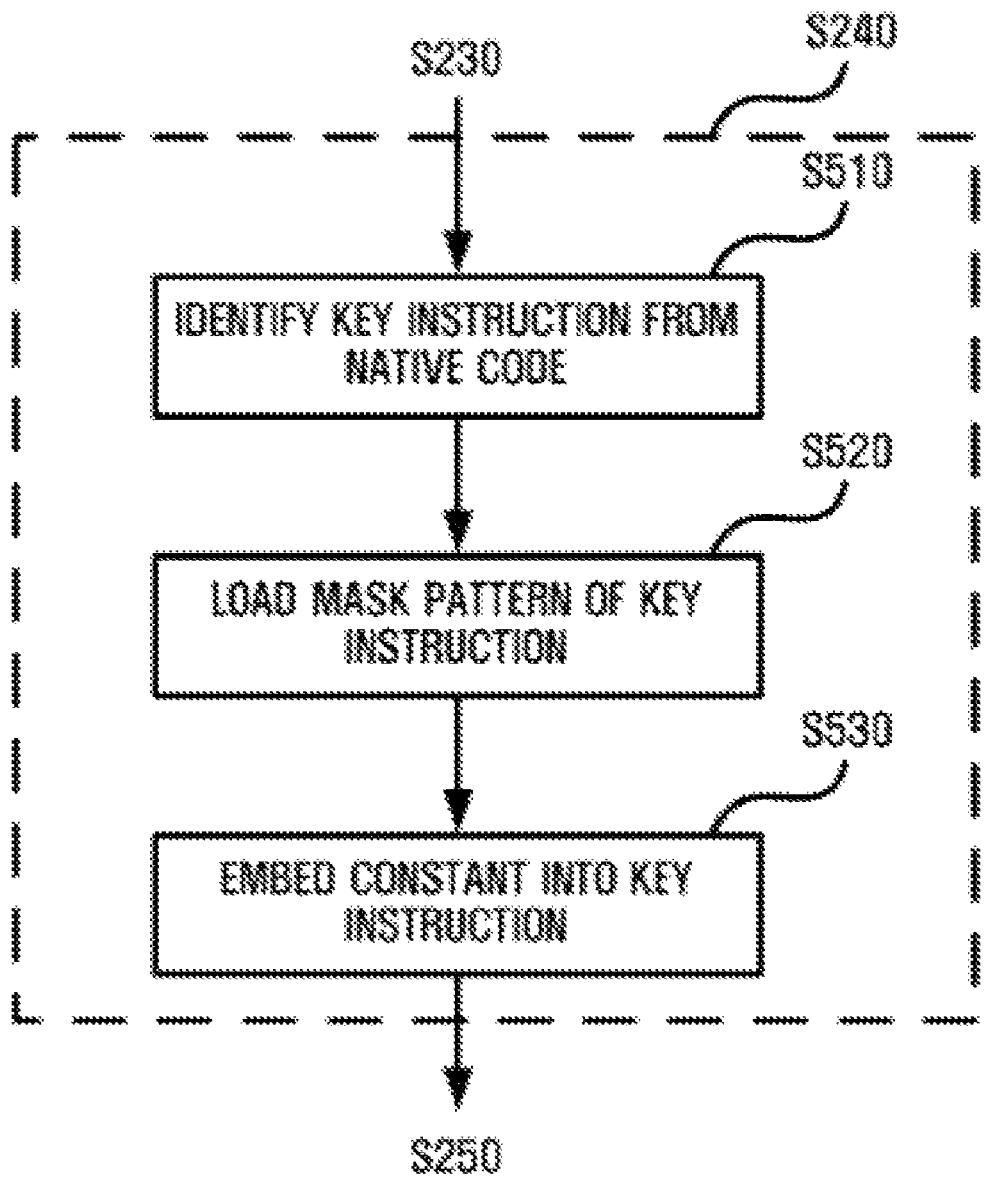
FIG. 5 is a flow diagram illustrating a process of embedding constants into the invoked native code in the method of accelerating Java translation according to an exemplary embodiment of the parent invention.

FIG. 5 is a flow diagram illustrating a process of embedding constants into the invoked native code in the method for accelerating Java translation according to an exemplary embodiment of the parent invention.

The constant embedding unit 140 identifies key instructions using constants from the invoked native code in operation S510. The constant embedding unit 140 reads information about the key instructions from the lookup table unit 110 for reference in constant embedding. Since the native code having a pointer constitute a set of one or more native instructions, the key instructions with constants embedded therein can be identified from the native code without constants.

The constant embedding unit 140 loads the mask pattern of the key instructions stored in the lookup table unit 110 in operation S520. In most cases, immediate fields are fixed locations. In few cases where an immediate field is not at a fixed location, however, a complicated procedure may be necessary. In this regard, the mask pattern of the key instructions is stored in the lookup table unit 110 so that the constant embedding unit 140 reads the mask pattern from the lookup table unit 110 for reference in constant embedding. The constant embedding unit 140 embeds constants into the key instructions in operation S530. Here, the embedded constants are values corresponding to the parameter values input at the ends of the native code with the pointer generated thereat. That is, the parameter value of the bytecode is encoded into the immediate field of the native code.

The content of the present invention can be applied to not only the Java language but also other interpreter languages or virtual machine languages.

The apparatus and method for accelerating Java translation according to the exemplary embodiments of the present invention may provide one or more the following advantages.

First, memory usage can be reduced by generating native code optimized to parameterized bytecode.

Second, translation speed can be accelerated by generating native code optimized to parameterized bytecode.

Third, storage space can be reduced by reducing the number of native codes stored in a lookup table.

The effects of the present invention should not be limited to the foregoing description, and additional effects and advantages of the invention will be made more apparent to those skilled in the art from the spirit and scope of the invention as defined by the appended claims.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present exemplary embodiments be considered in all respects as illustrative and not restrictive, reference being made to the appended claims rather than the foregoing description to indicate the scope of the invention.

What is claimed is:

1. An apparatus for accelerating Java translation, the apparatus comprising:
    a lookup table unit which stores a lookup table including arrangements of bytecodes and native codes corresponding to the bytecodes;
    a decoder which generates a pointer to the native code corresponding to the feed bytecode in the lookup table;
    a parameterized bytecode processing unit which detects parameterized bytecode among the feed bytecode, and generates a pointer to native code required for constant embedding in the lookup table;
    a constant embedding unit which embeds constants into the native code with the pointer generated by the parameterized bytecode processing unit; and
    a native code buffer which stores native code generated by the decoder or the constant embedding unit.

2. The apparatus of claim 1, wherein the parameterized bytecode processing unit stores a list of parameterized bytecode.

3. The apparatus of claim 1, wherein the parameterized bytecode processing unit analyzes parameter values of the bytecode.

4. The apparatus of claim 1, wherein the constant embedding unit identifies key instructions using constants from non-key instructions among native instructions.

5. The apparatus of claim 1, wherein the constant embedding unit embeds constants into key instructions by reading a mask pattern of the key instructions stored in the lookup table unit.

6. The apparatus of claim 1, wherein the lookup table unit stores information about key instructions.

7. The apparatus of claim 1, wherein the lookup table unit stores a mask pattern of key instructions.

8. The apparatus of claim 1, wherein the decoder determines whether the feed bytecode exists in the lookup table.

9. The apparatus of claim 1, wherein the native code buffer stores the bytecode feed together with the generated native code, and the decoder determines whether the feed bytecode exists in the native code buffer.

10. The apparatus according to claim 1, wherein the embedded constants are values corresponding to parameter values input at ends of the native code with the pointer.

* * * * *